(12) United States Patent
Cho

(10) Patent No.: US 6,860,150 B2
(45) Date of Patent: Mar. 1, 2005

(54) MICROGYROSCOPE TUNABLE FOR TRANSLATIONAL ACCELERATION

(75) Inventor: Jin-woo Cho, Sungnam (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 10/635,471

(22) Filed: Aug. 7, 2003

(65) Prior Publication Data

US 2004/0069062 A1 Apr. 15, 2004

(30) Foreign Application Priority Data

Oct. 12, 2002 (KR) ........................................ 2002-62301

(51) Int. Cl.[7] ................................................ G01P 9/04
(52) U.S. Cl. ................................ 73/504.12; 73/504.14
(58) Field of Search ........................ 73/504.12, 504.14, 73/504.04

(56) References Cited

U.S. PATENT DOCUMENTS 5,408,877 A * 4/1995 Greiff et al. ............. 73/504.12

6,301,963 B1 * 10/2001 Park ........................ 73/504.12

* cited by examiner

Primary Examiner—John E. Chapman
(74) Attorney, Agent, or Firm—Lee, Sterba & Morse, P.C.

(57) ABSTRACT

A microgyroscope tunable against an external translational acceleration includes an oscillating mass floating over a wafer to oscillate in a first direction, a driving electrode for oscillating the oscillating mass, a sensing mass oscillating together with the oscillating mass and concurrently moving in a second direction, wherein the second direction is perpendicular to the first direction, a sensing electrode for sensing a motion of the sensing mass, and a sensing electrode supporting portion for movably securing the sensing electrode so that the sensing electrode can move in the second direction with the sensing mass. A microgyroscope according to the present invention is able to prevent sensing signals due to an external disturbance, such as noise or impulse.

10 Claims, 13 Drawing Sheets

MICROGYROSCOPE TUNABLE FOR TRANSLATIONAL ACCELERATION

BACKGROUND OF THE INVENTION

1. Field of the Invention

The present invention relates to a microgyroscope for sensing an angular velocity. More particularly, the present invention relates to a microgyroscope not readily affected by external disturbances, which is capable of synchronizing a sensing electrode and a corresponding sensing mass in a same direction and/or with a same resonant frequency in a sensing direction thereby eliminating unnecessary signal output made due to an external translational acceleration caused by disturbances, such as noise, shock, and the like.

2. Description of the Related Art

A gyroscope is a sensing device that detects rotational angular velocity, and is currently in use as a core part for precision navigation in ships and airplanes. Recently, developments in micro-electromechanical system (MEMS) technology have enabled the application of a gyroscope in a navigation device of automobiles and as a hand-oscillation compensating device of high performance video cameras.

A gyroscope operates based on a Coriolis force, which acts on a mass in a third axis direction when the mass, which is oscillating or rotating in a first axis direction, is applied with a force rotating at a constant angular velocity from a second axis direction normal to the first axis direction. The angular velocity is detected by sensing a change in the displacement of the sensing mass and a capacitance change.

Referring to FIG. 1, a conventional microgyroscope 10 of MEMS technology is provided with an oscillating mass 12, i.e., oscillating mass $M_a$, moving at a resonant frequency fa by an oscillating direction elastic body 13 that has a predetermined damping force, or a damper 15 and oscillates in a horizontal direction, i.e., in an X-axis direction, a drive electrode 16 having drive combs 17 arranged between oscillating combs 14 of the oscillating mass 12 at predetermined intervals and secured on a wafer 11, a sensing mass 18, i.e., sensing mass $M_s$, oscillating together with the oscillating mass 12 by a sensing direction elastic body 19 that has a predetermined damping force, or a damper 23, and then with application of rotational force at a constant angular velocity, oscillating in a vertical direction, i.e., in a Y-axis direction at a resonant frequency $f_s$, and a sensing electrode 22 having electrode combs 21 arranged between sensing combs 20 of the sensing mass 18 at predetermined intervals, and secured on the wafer 11.

The operation of the microgyroscope 10 constructed as above, will be explained below. First, as AC voltage is supplied to the drive electrode 16, the oscillating mass 12 and the sensing mass 18 oscillate in the X-axis direction by the oscillating and drive combs 14, 17 at the resonant frequency $f_a$.

As the microgyroscope 10 is rotated by an external force at an angular velocity $\Omega$, the oscillating mass 12 and the sensing mass 18 are subject to the Coriolis force in the Y-axis direction.

The degree of Coriolis acceleration is represented by:

$$\ddot{y}_{coriolis} = 2\Omega_z(t) \times \dot{x}(t) \tag{1}$$

where $\dot{x}(t)$ is the differentiation of time with respect to the displacement of the oscillating mass 12 in the X-axis direction, and t is time.

By the Coriolis acceleration, the sensing mass 18 is oscillated in the Y-axis direction by the sensing direction elastic body 19. If the sensing mass 18 is displaced in the Y-axis direction by even a minute distance, e.g., from several tens of nanometers to several nanometers, a capacitance between the sensing combs 20 of the sensing mass 18 and the electrode combs 21 of the sensing electrode 22 varies. Accordingly, the voltage change thereof is detected as an angular velocity.

However, in addition to the angular velocity $\Omega$, the microgyroscope 10 is equally exposed to external disturbances, such as noise or shock. If the microgyroscope is subject to such a disturbance, the sensing mass 18 is displaced due to a translational acceleration. The translational acceleration, particularly in the Y-axis direction, causes the sensing mass 18 to displace, and a subsequent sensing of unnecessary signals.

More specifically, the properties of the signals appearing during the vibration of the sensing mass 18 by the disturbance in the absence of input angular velocity $\Omega$ is expressed by:

$$A \cos \omega_o t \cdot \cos \omega_s t \tag{2}$$

where $\omega_a$ is a resonant frequency of the oscillating mass 12, $\omega_s$ is a resonant frequency of the sensing mass 18, and A is an amplitude.

Separately expressing two frequency components based on the above equation (2) will render:

$$1/2A[\cos(\omega_o-\omega_a)t+\cos(\omega_o+\omega_s)t] \tag{3}$$

One of the two frequency components is removed as it is passed through a low pass filter of a signal sensing circuit. The other frequency component, which is $1/2A[\cos(\omega_o-\omega_s)t$, however, is not removed and thus remains even after having passed through the low pass filter. This is because the resonant frequency $\omega_s$ of the sensing mass 18 is set higher than the resonant frequency $\omega_o$ of the oscillating mass 12 during the designing process to maximize sensitivity, thereby rendering a relatively small difference between the frequencies $\omega_o-\omega_s$.

Accordingly, as shown in FIG. 2, unnecessary signals are detected when an external shock is applied to the microgyroscope 10.

SUMMARY OF THE INVENTION

It is a feature of an embodiment of the present invention to provide a microgyroscope not easily affected by external disturbances, which is capable of synchronizing a sensing electrode and corresponding sensing mass in a same direction and/or with a same resonant frequency thereby eliminating unnecessary signal output made due to an external translational acceleration caused by disturbances, such as noise, shock, and the like.

In order to provide the above feature, an embodiment of the present invention provides a microgyroscope tunable against an external translational acceleration including an oscillating mass floating over a wafer to oscillate in a first direction, a driving electrode for oscillating the oscillating mass, a sensing mass oscillating together with the oscillating mass and concurrently moving in a second direction, wherein the second direction is perpendicular to the first direction, a sensing electrode for sensing a motion of the sensing mass, and a sensing electrode supporting portion for movably securing the sensing electrode so that the sensing electrode can move in the second direction with the sensing mass.

The sensing electrode supporting portion may be formed as a sensing electrode elastic body elastically disposed between the sensing electrode and the wafer for moving the sensing electrode in the second direction.

A resonant frequency of the sensing electrode in the second directions may either be equal to or similar to a resonant frequency of the sensing mass in the sensing direction.

According to another preferred embodiment of the present invention, a microgyroscope tunable against an external translational acceleration, includes an oscillating mass floating over a wafer to oscillate in a first direction, a plurality of first comb units arranged on an external side of the oscillating mass, at least one driving electrode unit having a plurality of second comb units arranged between the first comb units at predetermined intervals to oscillate the oscillating mass, a sensing mass movably arranged in the oscillating mass to oscillate together with the oscillating mass, while concurrently moving in a second direction, wherein the second direction is perpendicular to the first direction, a plurality of third comb units arranged in the second direction in one or more divisions defined in an interior of the sensing mass, at least one sensing electrode unit arranged in the divisions of the sensing mass, and having a plurality of electrode comb units that are arranged between the third comb units of the divisions at predetermined intervals, and a sensing electrode supporting portion for movably securing the sensing electrode unit such that the sensing electrode unit is moved in the second direction with the sensing mass.

The sensing electrode supporting portion may be formed as a sensing electrode beam elastic body elastically disposed between the sensing electrode unit and the wafer for oscillating the sensing electrode unit in the second direction. The sensing electrode beam elastic body may include an anchor secured on the wafer and extending upwards, and an elastic horizontal beam elastically disposed to connect both sides of the anchor with the sensing electrode unit.

A resonant frequency of the sensing electrode in the sensing direction may be either equal to or similar to a resonant frequency of the sensing mass in the second direction.

Each of the first, the second and the third comb units may include a plurality of combs.

The interior of the sensing mass may be defined as a single, or a plurality of divisions where a plurality of third comb units are respectively arranged in both sides thereof, and the sensing electrode unit may include one, or a plurality of sensing electrodes arranged respectively in the single or plurality of divisions of the interior of the sensing mass, and has a plurality of electrode comb units arranged between the third comb units at predetermined intervals.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2002-62301, filed on Oct. 12, 2002, and entitled: "Microgyroscope Tunable for Translational Acceleration," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
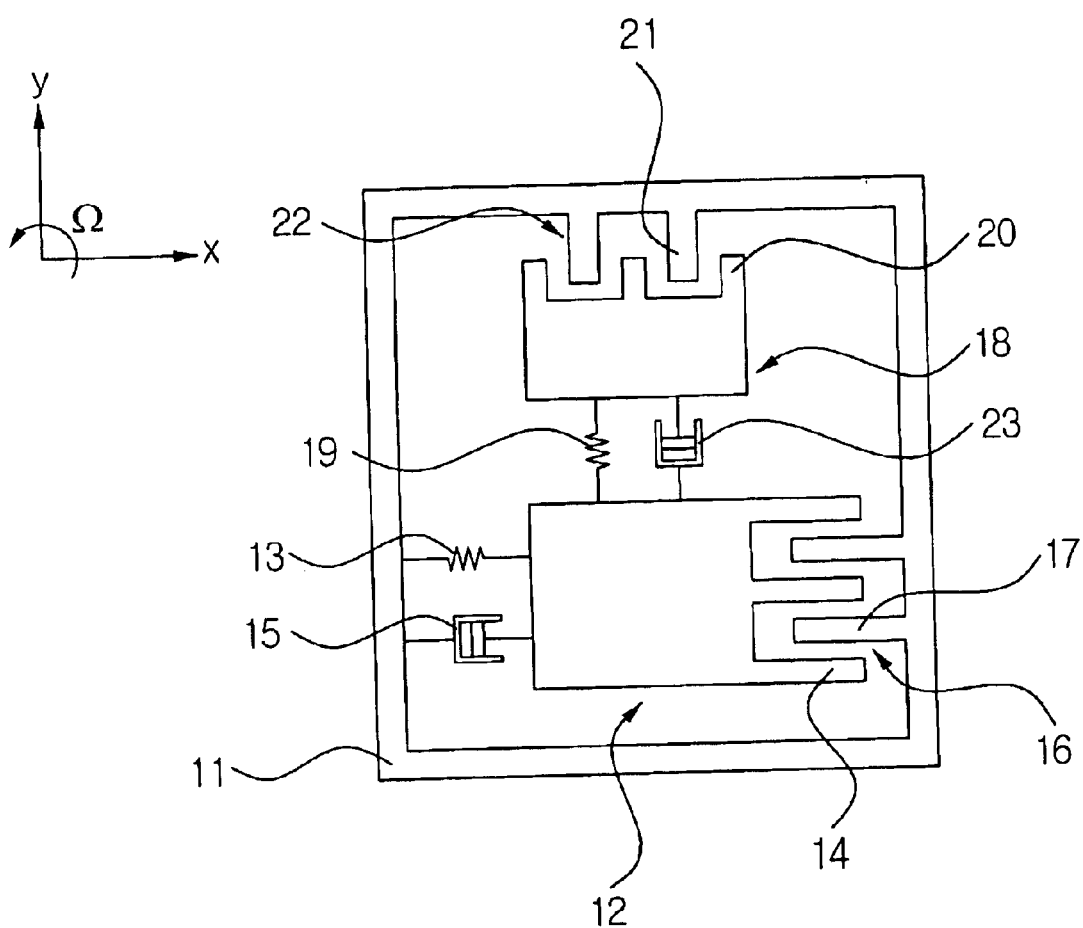
FIG. 1 illustrates a diagram of a conventional microgyroscope.
Figure 2:
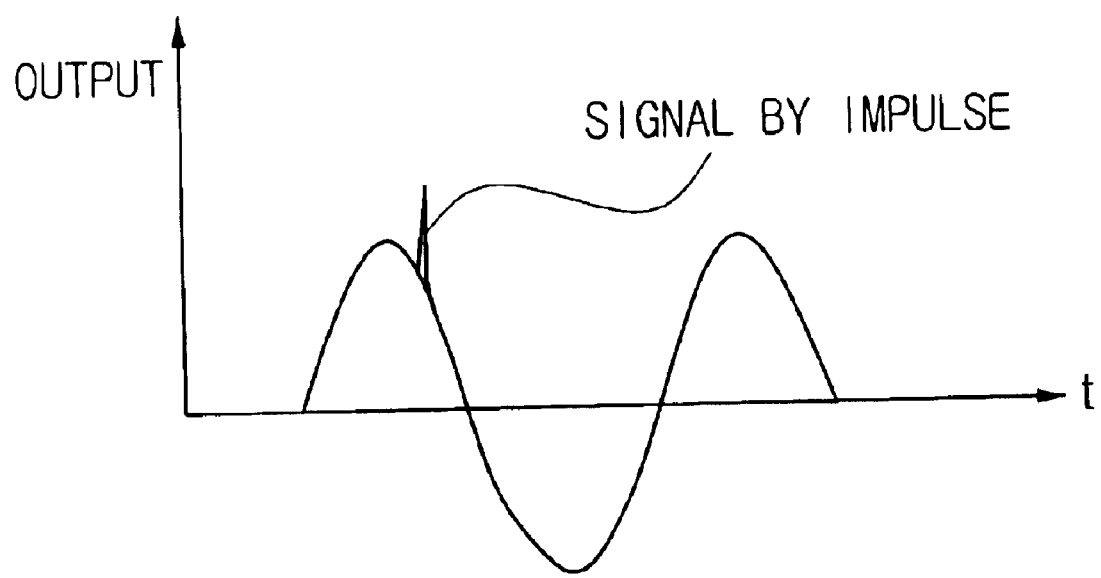
FIG. 2 is a graph illustrating a signal sensed when an external shock is applied to the microgyroscope of FIG. 1.
Figure 3:
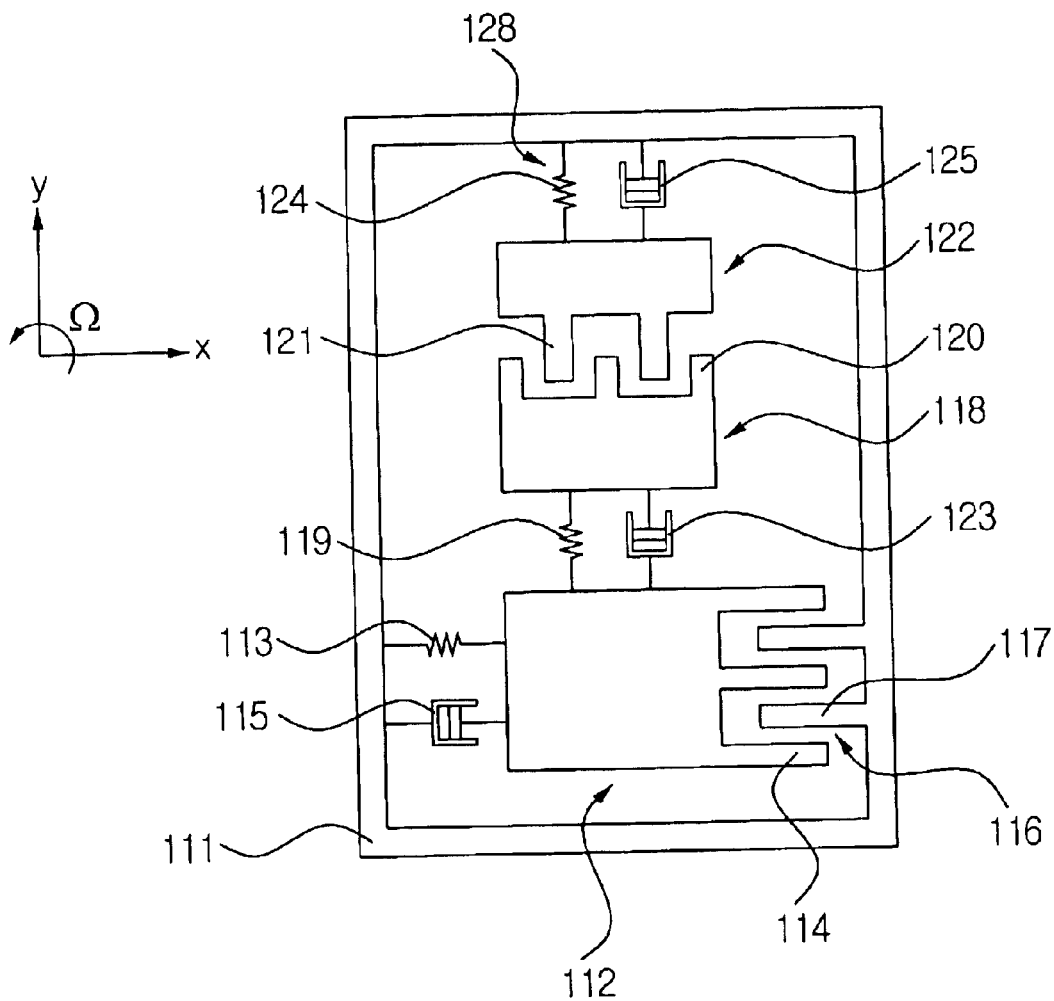
FIG. 3 illustrates a diagram of a microgyroscope according to an embodiment of the present invention.

FIG. 3 schematically shows a microgyroscope 100 according to an embodiment of the present invention.

The microgyroscope 100 according to an embodiment of the present invention is provided with an oscillating mass 112, i.e., oscillating mass $M_a$, floating over a wafer 111 to oscillate at a resonant frequency $f_a$ in a horizontal direction, i.e., in the X-axis direction, a driving electrode 116 secured on the wafer 111 and having driving combs 117 arranged between oscillating combs 114 of the oscillating mass 112 at predetermined intervals, sensing mass 118, i.e., a sensing mass $M_s$, arranged to oscillate at a resonant frequency $f_s$ in a vertical direction, i.e., in the Y-axis direction, when applied with an angular velocity Ω during oscillation together with the oscillating mass 112, a sensing electrode 122 movably secured on the wafer 111 and having electrode combs 121 arranged between sensing combs 120 of the sensing mass 118 at predetermined intervals, and a sensing electrode supporting portion 128 for movably securing the sensing electrodes 122 with respect to the wafer 111 so that, with the application of an external shock, the sensing electrode 122 can move in the same direction as the sensing direction of the sensing mass 118, i.e., move in the Y-axis direction.

The oscillating mass 112 is oscillated in the X-axis direction by an oscillating direction elastic body 113 elastically disposed between the oscillating mass 112 and the wafer 111. The elastic body 113 is provided with a predetermined damping force, or a damper 115. The sensing mass 118 is oscillated in the X-axis direction together with the oscillating mass 112, and oscillated in a sensing direction, i.e., in the Y-axis direction, with the application of rotational force rotating at a predetermined angular velocity Ω.

Although FIG. 3 shows the oscillating mass 112 having driving combs 117 formed on one side, and a single driving electrode 116 being formed to correspond to the oscillating combs 114 by way of one example, it will be understood that the oscillating combs 114 may be additionally formed on the other side of the oscillating mass 112 and the driving electrode 116 may have positive and negative driving combs 117 symmetrically arranged to correspond to the oscillating combs 114.

In addition, although FIG. 3 depicts the sensing electrode 122 having one polarity, a pair of positive and negative electrodes may also be arranged, parallel to the Y-axis direction, for the purpose of reducing sensing noise and improving sensing accuracy. In this case, since the electric capacitance between the electrode combs 121 of the positive and negative sensing electrodes and the sensing comb 120 are opposite, if an external shock is applied, displacement of the sensing mass 118 in the Y-axis direction can be sensed by calculating a difference of capacitance generated from the positive and negative sensing electrodes 122.

The sensing electrode supporting portion 128 that movably secures the sensing electrode 122 to move in the Y-axis direction, is provided with a sensing electrode elastic body 124 elastically disposed between the sensing electrode 122 and the wafer 111. The sensing electrode elastic body 124 is provided with a predetermined damping force, or a damper 125.

A resonant frequency of the sensing electrode 122 in a sensing direction may be equal or similar to the resonant frequency of the sensing mass 118. Preferably, the resonant frequency of the sensing electrode 122 in a sensing direction equals the resonant frequency of the sensing mass 118 in the sensing direction.

The reason for this preferred condition will now be described. Assuming that there is no input of an angular velocity Ω externally input to the microgyroscope 100 of FIG. 3, but there is only the input of an impulse, since the oscillating mass 112 is quite rigid in the Y-axis direction, the Y-axis direction property of the impulse causes the movable oscillating electrode 122 and the sensing mass 118 to displace in the Y-axis direction by the sensing electrode elastic body 124 and a sensing direction elastic body 199, which is elastically disposed between the sensing mass 118 and the oscillating mass 112. The sensing direction elastic body 119 is provided with a predetermined damping force, or a damper 123.

Figure 4A:
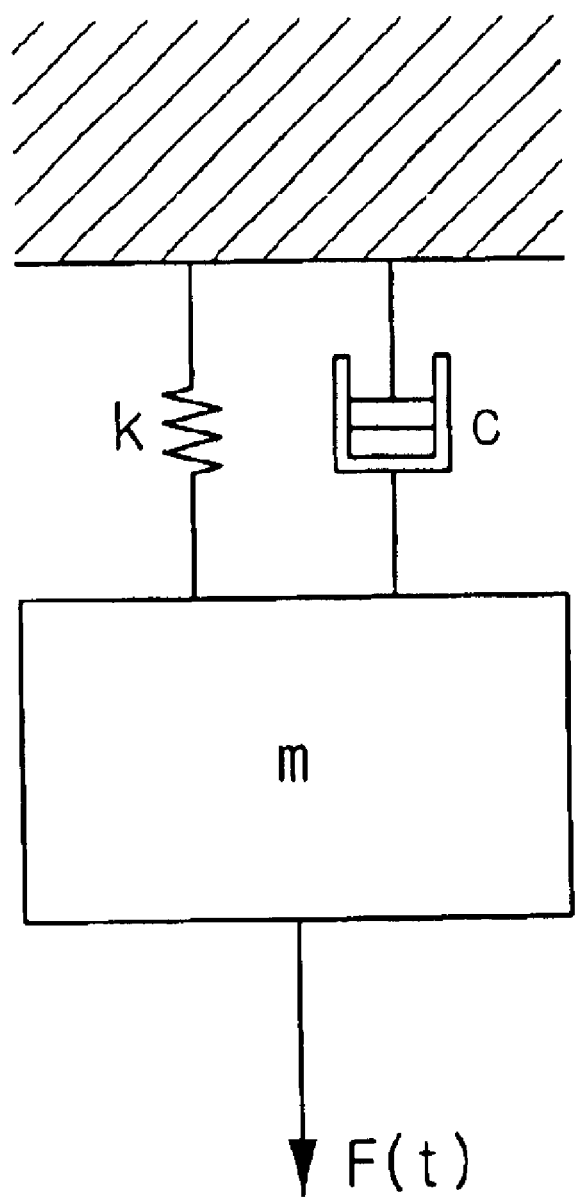
FIG. 4A illustrates a schematic view of a 1-degree-of-freedom system for explaining a principal of a microgyroscope according to an embodiment of the present invention.

The response characteristic of the sensing electrode 122 and the sensing mass 118 by the application of the Y-axis direction impulse approximates the response characteristic of a 1-degree-of-freedom system having a mass M, spring constant k, and a damping coefficient c, as shown in FIG. 4A.

Figure 4B:
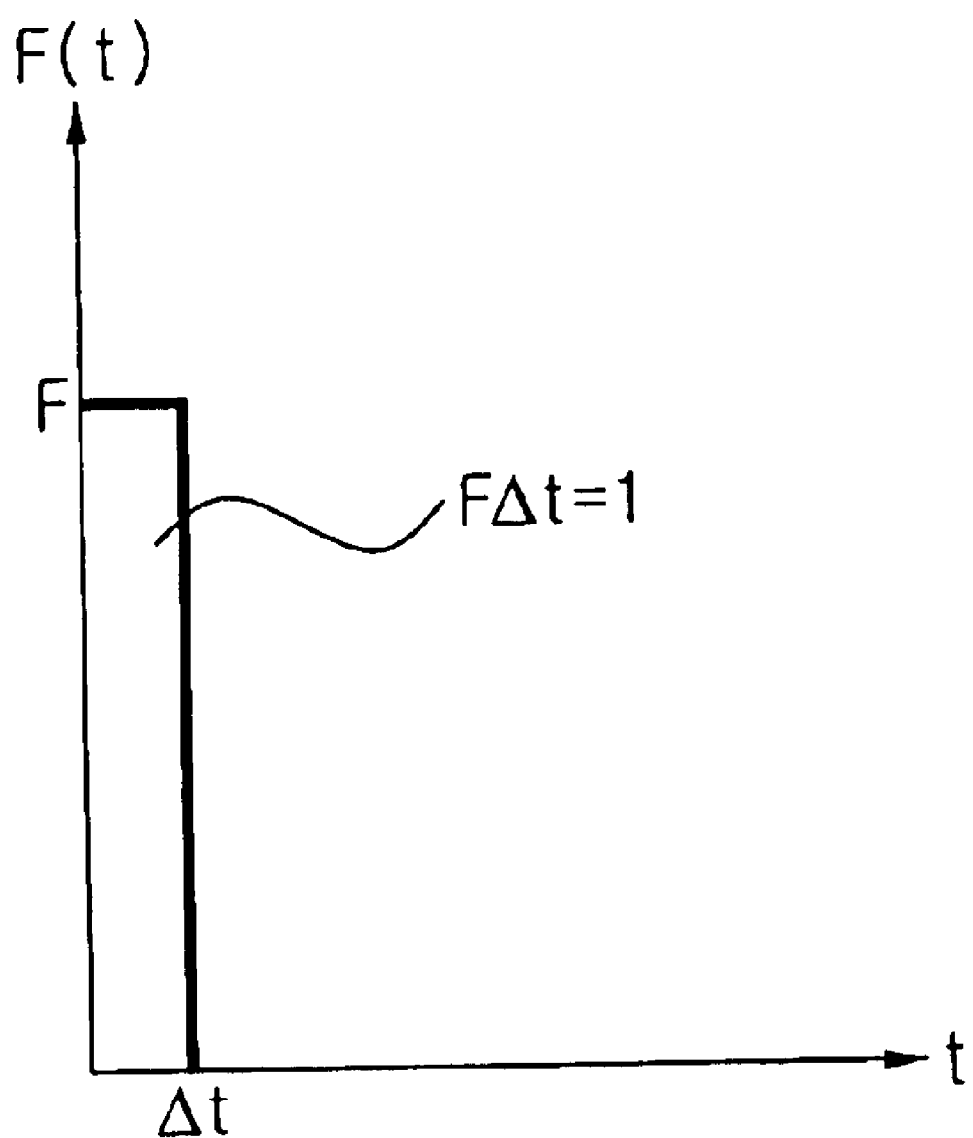
FIGS. 4B and 4C are graphs illustrating a unit shock and a response characteristic thereof of the 1-degree-of-freedom system.

The response characteristic of the 1-degree-of-freedom system being applied with a unit impulse as shown in FIG. 4B is as follows:

$$y(t) = \frac{e^{-\xi\omega_n t}}{m\omega_d}\sin(\omega_d t) \quad (4)$$

$$\xi = \frac{c}{2m\omega_n}, \ \omega_d = \omega\sqrt[n]{1-\xi^2}, \ \omega_n = \sqrt{\frac{k}{m}}$$

Figure 4C:
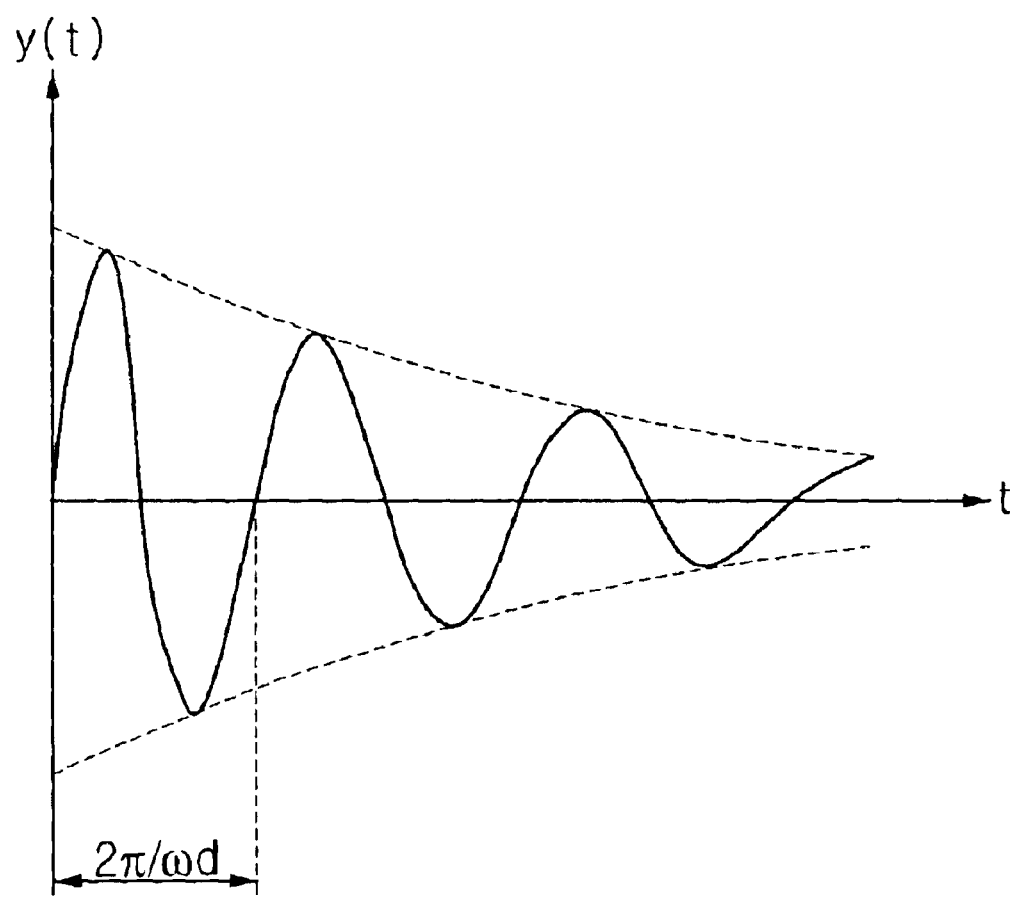

As understood from equation (4), with the application of an impulse, the response characteristic of the 1-degree-of-freedom system is expressed as the resonant frequency of the mass M as shown in FIG. 4C.

Since the response characteristic of the sensing electrode 122 and the sensing mass 188 due to the Y-axis direction impulse is expressed as the resonant frequency, if the resonant frequency of the sensing electrode 122 in the sensing direction equals the resonant frequency of the sensing mass 118 in the sensing direction, the relative position of the sensing electrode 122 and the sensing mass 118 remains constant even when a Y-axis direction impulse is applied thereto.

More specifically, it is assumed that a first undamped 1-degree-of-freedom system with a mass $M_1$ and a spring constant $k_1$, and a second undamped 1-degree-of-freedom system with a mass $M_2$ and a spring constant $k_2$ have the same resonant frequency $W_1$ and $W_2$, respectively. Thus, $k_1/M_1 = k_2/M_2$ and an initial displacement is zero (0). Accordingly, displacement of the first and the second systems by time (t) is obtained as follows:

$$x(t) = \frac{v_0}{\omega_n}\sin\omega_n t \quad (5)$$

where $v_0$ is initial velocity.

Accordingly, if the initial velocity $v_0$ due to the external impulse applied to the first and the second systems is equal in each system, the response characteristic of the first and the second systems is similarly identical.

For example, assuming that the mass $M_1$ of the first system is applied with the impulse G, with velocity v is 0 at time $t=0^-$, and that the time immediately after the application of impulse is t0, the following equation is obtained:

$$G = M_1 v_1(t=0) - M_1 v_1(t=0^-) = M_1 v_1(t=0) \quad (6)$$

Accordingly, the initial velocity ($v_1(t=0)$) of the mass $M_1$ is $$\frac{G}{M_1}.$$

Assuming that the mass $M_2$ of the second system is applied with a different impulse from the mass $M_1$, but with the same acceleration, the acceleration a to the mass $M_1$, i.e., the acceleration a with respect to the mass $M_2$, is, by the relation of $$M_1 a = \frac{G}{\Delta t}, \ \frac{G}{M_1 \Delta t}.$$

Accordingly, the following equation is obtained with respect to the mass $M_2$.

$$M_2 a = M_2 \left[ \frac{v_2(t=0) - v_2(t=0^-)}{\Delta t} \right] = M_2 \frac{v_2(t=0)}{\Delta t} \quad (7)$$

Accordingly, the initial velocity D2 (t=0) of the mass $M_2$ is, $$v_2(t=0) = a\Delta t$$
$$= \frac{G}{M_1 \Delta t} \Delta t$$
$$= \frac{G}{M_1}$$

With the same initial velocity of the masses $M_1$, $M_2$ of the first and the second systems, and the same resonant frequency, there is provided the same response characteristic to the external impulse.

In the case of microgyroscope 100, the sensing mass 118 and the sensing electrode 122 with different shapes and volumes would have different damping coefficients c in an atmospheric environment. Once being packed in a vacuum, however, the damping coefficients c of the sensing mass 118 and the sensing electrode 122 are only influenced by the damping, property of the material forming the same. As a result, the damping coefficients c of the sensing mass 118 and the sensing electrode 122 are almost equal to each other.

As described above, by using the movable sensing electrode 122 which is movably secured in the wafer 111, and the fact that the sensing mass 118 and the sensing electrode 122 have the same displacement with respect to the external impulse, detection of a signal due to the external impulse can be prevented.

The operation of the microgyroscope 100 constructed as above according to the present invention will be described below.

First, with the application of AC power to the driving electrode 116 the oscillating mass 112 and the sensing mass 118 are oscillated in the X-axis direction with resonant frequency fa due to the electrostatic force between the oscillating and driving combs 114 and 117, respectively, and the oscillating direction elastic body 113.

At this time, as the microgyroscope 100 is rotated by the external force with the angular velocity Q, the oscillating mass 112 and the sensing mass 118 are subject to the Coriolis force in the Y-axis direction, and accordingly, the sensing mass 118 is oscillated by the sensing direction elastic body 119 in the Y-axis direction.

With the displacement of the sensing mass 118 in the Y-axis direction by several tens of nanometers to several nanometers, the sensing combs 120 of the sensing mass 118 are displaced relative to the electrode combs 121 of the sensing electrodes 122. As a result, an electric capacitance between the sensing combs and the electrode combs 120 and 121, respectively, varies. Accordingly, the variation of a voltage signal is detected as the angular velocity by a circuit (not shown).

Assuming that the impulse is imposed externally, since the oscillating mass 112 has relatively great rigidity in the Y-axis direction, the Y-axis component of the impulse causes only the sensing electrode 122 and the sensing mass 118 to displace.

However, since the response characteristic of the sensing electrode 122 and the sensing mass 118 to the Y-axis component of the impulse may be expressed as the identical resonant frequency due to the sensing electrode elastic body 124, displacement of the sensing electrode 122 and the sensing mass 118 is identical with respect to each other even with the application of the Y-axis component of the impulse. Accordingly, the electric capacitance between the sensing and electrode combs 120 and 121, respectively, of the sensing electrode 122, and the sensing mass 118 is free from the influence of the Y-axis component of the impulse. Thus, sensing of the signal due to the Y-axis component of the impulse is prevented.

[Embodiment 1]

Figure 5:
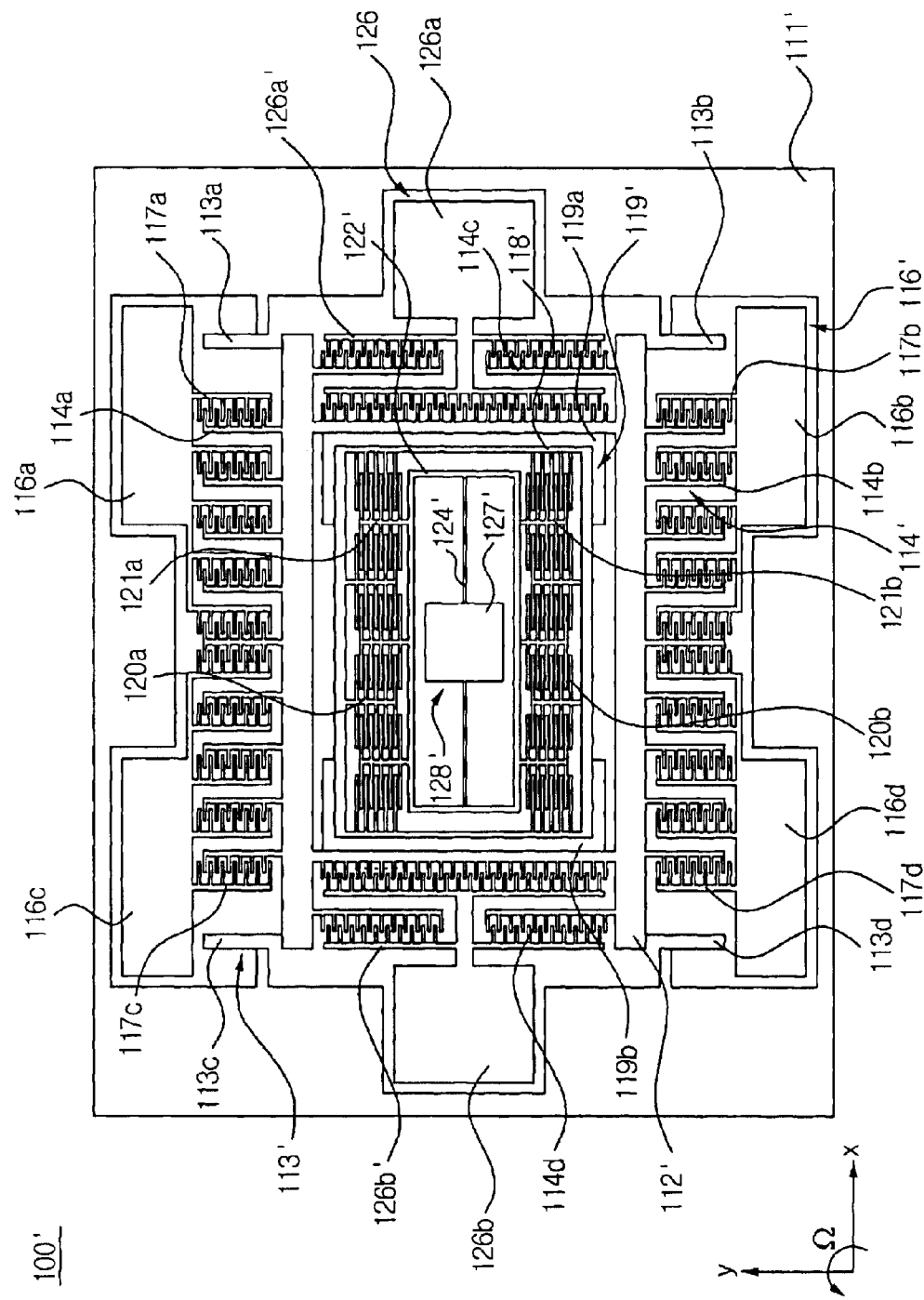
FIG. 5 illustrates a plan view of a microgyroscope according to a preferred embodiment of the present invention.

Referring to FIG. 5, a microgyroscope 100' according to a preferred embodiment of the present invention is illustrated.

The microgyroscope 100' according to this first preferred embodiment of the present invention is provided with an elongated oscillating mass 112', which is formed to float over a wafer 111', to oscillate in a horizontal direction, i.e., in the X-axis direction, a first comb 114' including a plurality of first combs 114a, 114b disposed on upper and lower sides (as shown in FIG. 5) of the oscillating mass 112' at predetermined intervals, a driving electrode unit 116' including four driving electrode units 116a, 116b, 116c, 116d having a plurality of second combs 117a, 117b, 117c, 117d arranged between the first combs 114a, 114b at predetermined intervals to oscillate the oscillating mass 112' with the application of a power supply, sensing mass 118' arranged in the oscillating mass 112' to oscillate together with the oscillating mass 112' in a sensing direction, i.e., in a vertical, or Y-axis, direction, a plurality of third combs 120a, 120b arranged on the upper and lower sides (as shown in FIG. 5) inside of the sensing mass 118', a sensing electrode unit 122' having a plurality of electrode comb units 121a, 121b arranged between the third combs 120a, 120b at predetermined intervals, and a sensing electrode supporting portion 128' for movably securing the sensing electrode unit 122' with respect to the wafer 111' so that the sensing electrode unit 122' is oscillated in the same direction as the sensing direction of the sensing mass 118', i.e., in the Y-axis direction.

The oscillating mass 112' is oscillated in the X-axis direction by an oscillating direction elastic securing portion 113' of a predetermined damping force elastically disposed between the oscillating mass 112' and the wafer 111'. The oscillating direction elastic securing portion 113' includes four oscillating direction beam elastic bodies 113a, 113b, 113c, 113d arranged in proximity to corners of the oscillating mass 112'.

On the left and right outer sides of the oscillating mass 112' (as shown in FIG. 5) is formed a comb sensor 126 that senses the vibration of the sensing mass 118' in the X-axis direction. The comb sensor 126 includes two comb sensing units 126a, 126b having elongated fifth combs 126a', 126b' oppositely formed with respect to the fourth combs 114c, 114d formed on the left and right outer sides of the oscillating mass 112', respectively, to prevent the oscillating voltage from transmitting along a route, such as a bottom surface, to the oscillating mass 112' and the like, and subsequently interfering with the comb sensor 126 during the oscillation of the first combs 114a, 114b of the oscillating mass 112' through the driving electrode units 116a, 116b, 116c, 116d.

The driving electrode units 116a, 116b, 116c, 116d are constructed to, be applied with positive and negative voltages in symmetrical relation with each other so that the positive and negative voltages are counterbalanced when the AC interference voltage generated due to the oscillating voltage is applied to both ends of the respective comb sensing units 126a, 126b. For example, it may be constructed such that the positive voltage is applied to the driving electrode units 116a, 116c, while negative voltage is applied to the driving electrode units 116b, 116d. Since the oscillating mass 112' is hardly influenced by the level of oscillating voltage, the oscillating mass 112' can resonate stably.

The sensing mass 118' is oscillated in the Y-axis direction by a sensing direction elastic securing portion 119' elastically disposed between the sensing mass 118' and the oscillating mass 112'. The sensing direction elastic securing portion 119' includes two sensing direction beam elastic bodies 119a, 119b having a predetermined damping force that are arranged on both sides of the sensing mass 118'.

The sensing electrode unit 122' is constructed of either a positive, or a negative, sensing electrode connected to a positive, or a negative, electrode supporting portion (not shown), and with the application of external impulse, is capable of sensing the displacement of the sensing mass 118' in the Y-axis direction by calculating the difference of an electric capacitance between the electrode combs 121a, 121b of the positive, or the negative, sensing electrode 122' and the third combs 120a, 120b of the sensing mass 118'. In the case of employing a general circuit that detects the variation of the electric capacitance, the angular velocity signal can be sensed by sensing the voltage signal, which is in proportional relation with the variation of electric capacitance.

The sensing electrode supporting portion 128' is formed as a sensing electrode beam elastic body that has an anchor or a vertical column 127' secured on the upper surface of the wafer 111' and extended upwardly, and an elastic horizontal beam 124' elastically disposed to connect the both upper sides of the anchor 127' and the sensing electrode unit 122'.

It is designed such that the sensing direction resonant frequency of the sensing electrode unit 122' supported by the sensing electrode beam elastic body 128' is identical to the sensing direction resonant frequency of the sensing mass 118' supported by the sensing direction beam elastic bodies 119a, 119b.

Accordingly, each of the sensing electrode unit 122' and the sensing mass 118' under the Y-axis impulse is displaced as much as the other is, and as a result, the electric capacitance between the electrode comb units 121a, 121b of the sensing electrode unit 122' and the third combs 120a, 120b of the sensing mass 118' is not influenced by the Y-axis component of the impulse. Thus, the sensing of a signal due to the Y-axis component of the impulse is prevented.

The operation of the microgyroscope 100' constructed as above is almost identical to that of the microgyroscope 100 of FIG. 3 in principle. Accordingly, a description thereof will be omitted.

[Embodiment 2]

Figure 6:
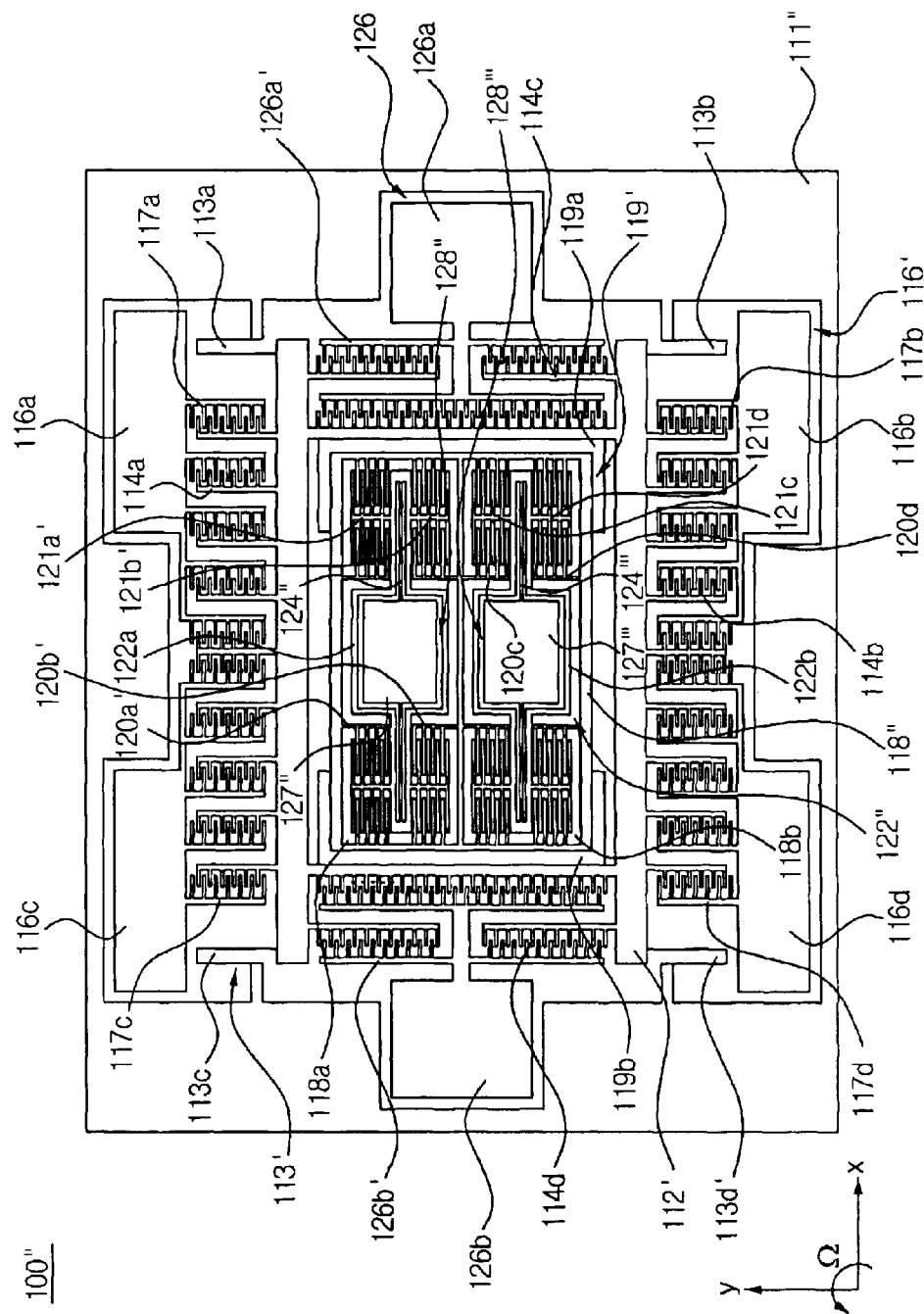
FIG. 6 illustrates a plan view of a microgyroscope according to another preferred embodiment of the present invention.

Referring to FIG. 6, a microgyroscope 100" according to another preferred embodiment of the present invention is illustrated.

The microgyroscope 100" according to this embodiment is similar to the first preferred embodiment of the present invention, as shown in FIG. 5, except that the sensing mass 118" is divided into two divisions 118a, 118b, and the sensing electrode unit 122" is arranged in the two divisions 118a, 118b.

The sensing mass 118" is provided with a plurality of third combs 120a', 120b'; 120c, 120d arranged respectively on both upper and lower sides (as shown in FIG. 6) of the respective divisions 118a, 118b in the sensing direction.

The sensing electrode unit 122" includes first and second sensing electrodes 122a, 122b respectively arranged inside of the divisions 118a, 118b.

The first and the second sensing electrodes 122a, 122b are provided with a plurality of electrode comb units 121a', 121b'; 121c, 121d arranged between the respective third combs 120a', 120b'; 120c, 120d of the divisions 118a, 118b opposite to the third combs 120a', 120b'; 120c, 120d at predetermined intervals.

Further, the first and the second sensing electrodes 122a, 122b are movably supported on the wafer 111" by the first and the second sensing electrode supporting portions 128", 128''', each being constructed as a sensing electrode beam elastic body that has a vertical column 127", 127''', and an elastic horizontal beam 124, 124''', so as to move in the Y-axis direction.

Further, in order to reduce sensing noise and thus increase the sensitivity, the first and the second sensing electrodes 122a, 122b are constructed to be connected with the positive and the negative electrode supporting portions (not shown) to have a positive polarity and a negative polarity. Accordingly, with the application of an external impulse, an electric capacitance of the positive sensing electrode and of the negative sensing electrode varies oppositely to each other, and by the difference of the electric capacitance of the positive and the negative sensing electrodes, the displacement of the sensing mass 118" in the Y-axis direction is sensed.

Figure 7A:
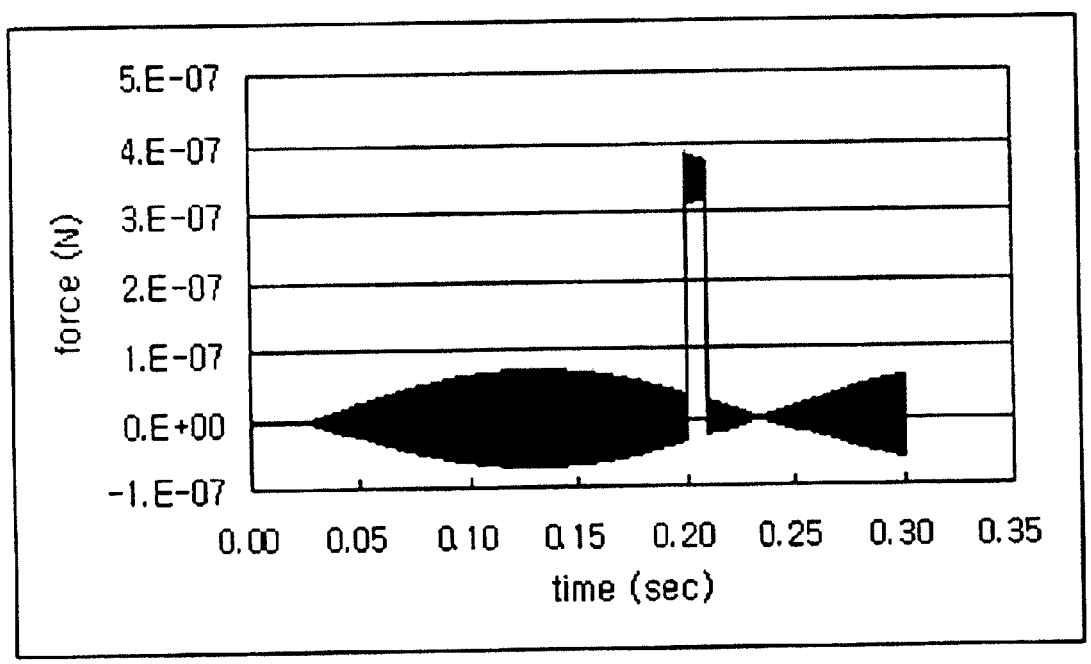
FIGS. 7A–7E are graphs illustrating the calculated results of the relation between time and the relative displacement of first and second sensing electrodes with respect to the sensing mass in accordance with resonant frequencies f thereof in the microgyroscope of FIG. 6 and the relation between time and relative displacement of first and second stationary electrodes with respect to the sensing mass in accordance with resonant frequencies f thereof in the conventional microgyroscope, when an acceleration impulse of 1 G is applied for 0.01 sec.
Figure 7B:
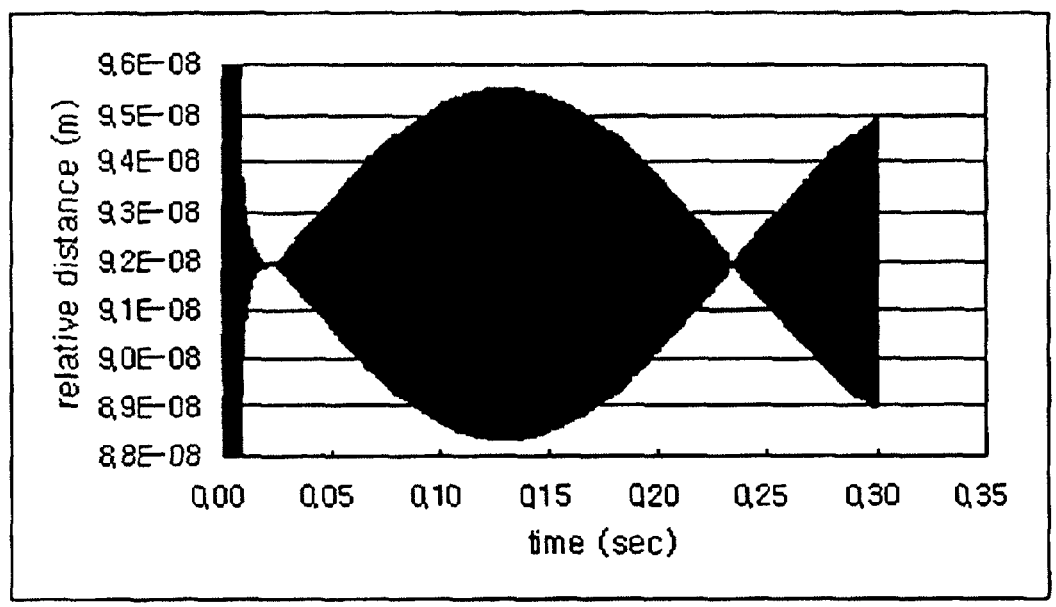
Figure 7C:
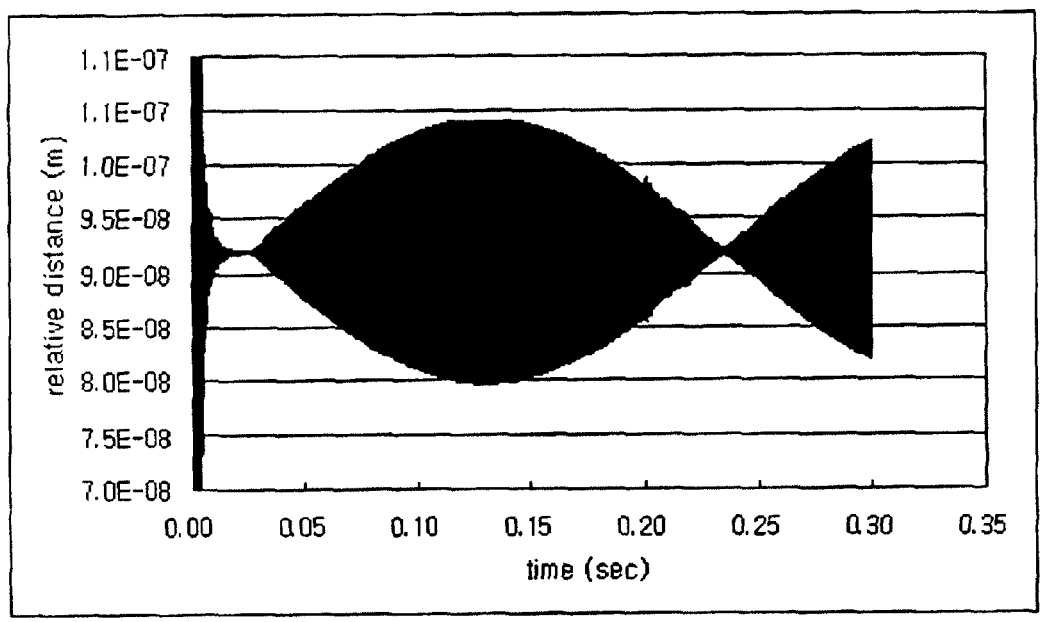
Figure 7D:
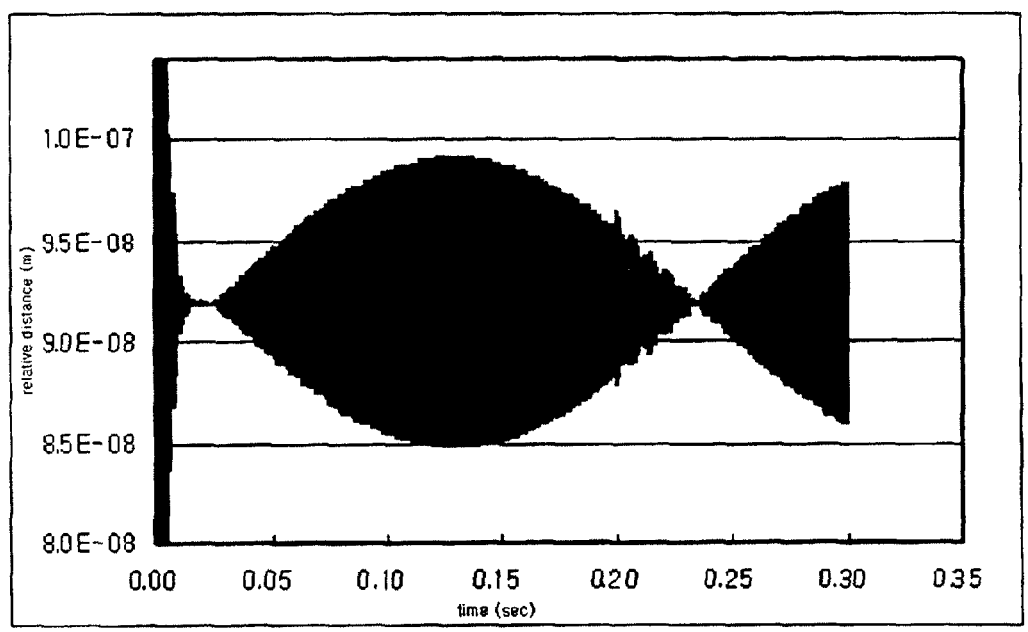

FIGS. 7B, 7C and 7D illustrate the calculated results of the relation between time and the relative distance of the displacement of the first and the second sensing electrodes 122a, 122b relative to the sensing mass 118" according to the resonant frequencies f of the sensing mass 118", the electrode comb units 121a', 121b' of the first sensing electrode 122a and the electrode comb units 121c, 121d of the second sensing electrode 122b, when an acceleration impulse of 1 G is applied for 0.01 sec as shown in FIG. 7A.

The calculation is based on the sensing mass 118" having a weight of 3.4E-8 kg, a stiffness of 14.50 N/m, and a damping coefficient of 6.4E-6 N-sec/m, and first and the second sensing electrodes 122a, 122b having a weight of 1.7E-8 kg, a stiffness of 72.50 N/m, and a damping coefficient of 1.6E-6 N-sec/m, with a driving frequency of 10.4 kHz, a tuning voltage of 3 V, and an input angular velocity $\Omega$ of w=15 and $R_0$=30 rad/sec.

FIG. 7B shows the relative distance of the sensing mass 118 and the first sensing electrode 122a when the resonant frequency f of the sensing mass 118", the resonant frequency f of the electrode comb units 121a', 121b' of the first sensing electrode 122a and the resonant frequency f of the electrode comb units 121c, 121d of the second sensing electrode 122b are equal to each other at 10.32 kHz, which indicates that there is no response to the external acceleration impulse of 1 G.

Figure 7E:
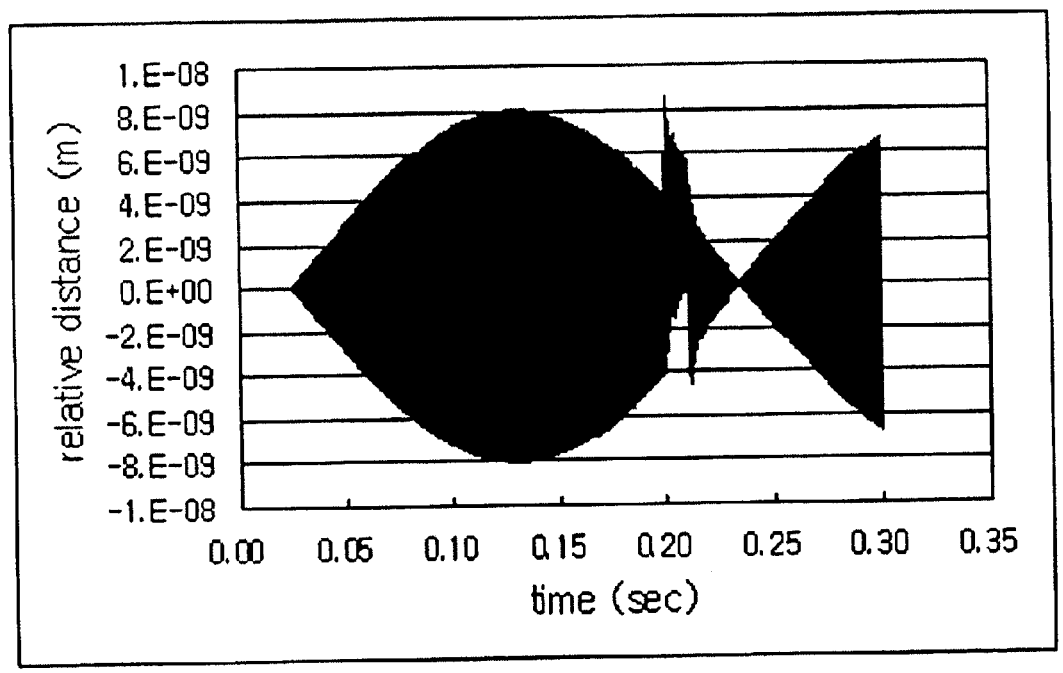

FIGS. 7C and 7D illustrate the results when the resonant frequencies f of the sensing mass 118", the electrode comb units 121a', 121b' of the first sensing electrode 122a, and the electrode comb units 121c, 121d of the second sensing electrode 122b are respectively sensed as 10.32 kHz, 10.53 kHz, and 10.37 kHz, and 10.32 kHz, 10.59 kHz, and 10.59 kHz due to fabrication errors. As shown in FIGS. 7C and 7D, although there is an abnormal signal being sensed, it is negligible as compared to the abnormal signals of FIG. 7E that are sensed to the first and the second sensing electrodes 122a, 122b being secured on the wafer 111" as in the prior art case when impulse of 1 G is applied for 0.01 sec.

Since the operation of the microgyroscope 100" according to the second preferred embodiment of the present invention is almost identical to that of the microgyroscope of FIG. 3 in principle, a description thereof will be omitted.

As described above, by arranging the sensing mass and the sensing electrodes opposite to the sensing mass to move in the same direction and/or with the same resonant frequency in a sensing direction, the microgyroscope according to the present invention does not sense unnecessary signals generated due to an external translational acceleration caused by external disturbances, such as noise and impulse.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A microgyroscope tunable against an external translational acceleration, comprising:

an oscillating mass floating over a wafer to oscillate in a first direction;

a driving electrode for oscillating the oscillating mass;

a sensing mass oscillating together with the oscillating mass and concurrently moving in a second direction, wherein the second direction is perpendicular to the first direction;

a sensing electrode for sensing a motion of the sensing mass; and a sensing electrode supporting portion for movably securing the sensing electrode so that the sensing electrode can move in the second direction with the sensing mass.

2. The microgyroscope as claimed in claim 1, wherein the sensing electrode supporting portion comprises a sensing electrode elastic body elastically disposed between the sensing electrode and the wafer for moving the sensing electrode in the second direction.

3. The microgyroscope as claimed in claim 2, wherein a resonant frequency of the sensing electrode in the second direction is either equal to or similar to a resonant frequency of the sensing mass in the second direction.

4. A microgyroscope tunable against an external translational acceleration, comprising:

an oscillating mass floating over a wafer to oscillate in a first direction;

a plurality of first comb units arranged on an external side of the oscillating mass;

at least one driving electrode unit having a plurality of second comb units arranged between the first comb units at predetermined intervals to oscillate the outer gimbals oscillating mass;

a sensing mass movably arranged in the oscillating mass to oscillate together with the oscillating mass, while concurrently moving in a second direction, wherein the second direction is perpendicular to the first direction;

a plurality of third comb units arranged in the second direction in one or more divisions defined in an interior of the sensing mass;

at least one sensing electrode unit arranged in the divisions of the sensing mass, and having a plurality of electrode comb units that are arranged between the third comb units of the divisions at predetermined intervals; and a sensing electrode supporting portion for movably securing the sensing electrode unit such that the sensing electrode unit is moved in the second direction with the sensing mass.

5. The microgyroscope as claimed in claim 4, wherein the sensing electrode supporting portion comprises a sensing electrode beam elastic body elastically disposed between the sensing electrode unit and the wafer for oscillating the sensing electrode unit in the second direction.

6. The microgyroscope as claimed in claim 5, wherein the sensing electrode beam elastic body comprises:

an anchor secured on the wafer and extending upwards; and an elastic horizontal beam elastically disposed to connect both sides of the anchor with the sensing electrode unit.

7. The microgyroscope as claimed in claim 6, wherein a resonant frequency of the sensing electrode in the sensing direction is either equal to or similar to a resonant frequency of the sensing mass in the second direction.

8. The microgyroscope as claimed in claim 7, wherein the first, the second and the third comb units each comprise a plurality of combs.

9. The microgyroscope as claimed in claim 8, wherein the interior of the sensing mass is defined as a single division where a plurality of third comb units are respectively arranged in both sides thereof, and the sensing electrode unit comprises one sensing electrode that is arranged in the single division of the interior of the sensing mass, and has a plurality of electrode comb units arranged between the third comb units at predetermined intervals.

10. The microgyroscope as claimed in claim 8, wherein the interior of the sensing mass is defined as more than two divisions where a plurality of third comb units are respectively arranged in both sides thereof, and the sensing electrode unit comprises a plurality of sensing electrodes that are respectively arranged in the divisions of the interior of the sensing mass, and has a plurality of electrode comb units arranged between the third comb units at predetermined intervals.

* * * * *